United States Patent
Minoya

(10) Patent No.: US 11,673,271 B2
(45) Date of Patent: Jun. 13, 2023

(54) TRAJECTORY GENERATION APPARATUS, MULTI-LINK SYSTEM, AND TRAJECTORY GENERATION METHOD

(71) Applicant: DENSO CORPORATION, Kariya (JP)

(72) Inventor: Kenichi Minoya, Kariya (JP)

(73) Assignee: DENSO CORPORATION, Kariya (JP)

( * ) Notice: Subject to any disclaimer, the term of this patent is extended or adjusted under 35 U.S.C. 154(b) by 241 days.

(21) Appl. No.: 17/166,817

(22) Filed: Feb. 3, 2021

(65) Prior Publication Data

US 2021/0237270 A1  Aug. 5, 2021

(30) Foreign Application Priority Data

Feb. 5, 2020 (JP) .............................. JP2020-018237

(51) Int. Cl.
*B25J 9/16* (2006.01)
*B25J 13/08* (2006.01)

(52) U.S. Cl.
CPC .............. *B25J 9/1666* (2013.01); *B25J 9/163* (2013.01); *B25J 9/1607* (2013.01); *B25J 13/089* (2013.01)

(58) Field of Classification Search
CPC ........ B25J 9/1666; B25J 9/1607; B25J 9/163; B25J 13/089; B25J 9/1664; B25J 9/1676; G05B 2219/40371
See application file for complete search history.

(56) References Cited

U.S. PATENT DOCUMENTS

| | | | | |
|---|---|---|---|---|
| 5,347,459 A | * | 9/1994 | Greenspan | B25J 19/06 |
| | | | | 700/255 |
| 9,833,898 B2 | * | 12/2017 | Toyoda | B25J 3/04 |
| 2012/0215351 A1 | * | 8/2012 | McGee | B25J 9/1676 |
| | | | | 700/248 |
| 2013/0325029 A1 | * | 12/2013 | Hourtash | A61B 34/30 |
| | | | | 606/130 |
| 2017/0173790 A1 | * | 6/2017 | Tan | B25J 19/021 |
| 2017/0190052 A1 | * | 7/2017 | Jaekel | B25J 9/1671 |
| 2017/0348856 A1 | * | 12/2017 | Nakaya | B25J 9/1666 |
| 2019/0091853 A1 | * | 3/2019 | Toshimitsu | B25J 9/0084 |

(Continued)

FOREIGN PATENT DOCUMENTS

| | | |
|---|---|---|
| JP | 2019-5834 A | 1/2019 |
| WO | 2019/021401 A1 | 1/2019 |
| WO | WO-2021117479 A1 * | 6/2021 |

OTHER PUBLICATIONS

A. H. Qureshi et. al., Motion Planning Networks: Bridging the Gap Between Learning-based and Classical Motion Planners (v1), CoRR(Computing Research Repository), submitted on Jul. 13, 2019 (arXiv:1907.06013v1 [cs.RO], Jul. 13, 2019), 19 pgs.

*Primary Examiner* — Adam R Mott
*Assistant Examiner* — Sagar Kc
(74) *Attorney, Agent, or Firm* — Maschoff Brennan

(57) ABSTRACT

In a trajectory generation apparatus, position coordinates of an obstacle existing in a motion space of a robot arm is acquired. A hand position at a second time, which is a time next to a first time, is estimated by using a learning result of machine learning, based on the position coordinates of the obstacle, a subject joint state of the robot arm at the first time, and a target joint state of the robot arm. A non-interfering joint state of the robot arm at which the obstacle does not interfere with the robot arm at the second time is searched for by using the hand position as a restriction.

11 Claims, 8 Drawing Sheets

(56) References Cited

U.S. PATENT DOCUMENTS

| | | | |
|---|---|---|---|
| 2019/0358813 A1* | 11/2019 | Graham | B25J 9/1664 |
| 2020/0078941 A1* | 3/2020 | Oka | B25J 9/1666 |
| 2020/0230815 A1* | 7/2020 | Nikovski | B25J 9/1674 |
| 2020/0242512 A1* | 7/2020 | Zhong | B25J 9/163 |
| 2020/0254616 A1* | 8/2020 | Ebrahimi Afrouzi | G05D 1/0246 |
| 2020/0338730 A1* | 10/2020 | Yamauchi | B25J 9/1664 |
| 2021/0001481 A1* | 1/2021 | Hayashi | B25J 9/1664 |
| 2022/0009101 A1* | 1/2022 | Itou | B25J 9/042 |

* cited by examiner $$\alpha_{t+1} = \alpha_t \pm \theta$$

COMPARATIVE

TRAJECTORY GENERATION APPARATUS, MULTI-LINK SYSTEM, AND TRAJECTORY GENERATION METHOD

CROSS REFERENCE TO RELATED APPLICATION

The present application is based on Japanese Patent Application No. 2020-018237 filed on Feb. 5, 2020, the disclosure of which is incorporated herein by reference.

TECHNICAL FIELD

The present disclosure relates to a trajectory generation apparatus that generates a trajectory of a multi-link mechanism, a multi-link system, and a trajectory generation method.

BACKGROUND

A technique is known for generating a trajectory of a multi-link mechanism such as a robot arm through learning or searching.

SUMMARY

According to an example of the present disclosure, a trajectory generation apparatus is provided as follows. In the trajectory generation apparatus, position coordinates of an obstacle existing in a motion space of a robot arm is acquired. A hand position at a second time, which is a time next to a first time, is estimated by using a learning result of machine learning, based on the position coordinates of the obstacle, a subject joint state of the robot arm at the first time, and a target joint state of the robot arm. A non-interfering joint state of the robot arm at which the obstacle does not interfere with the robot arm at the second time is searched for by using the hand position as a restriction.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
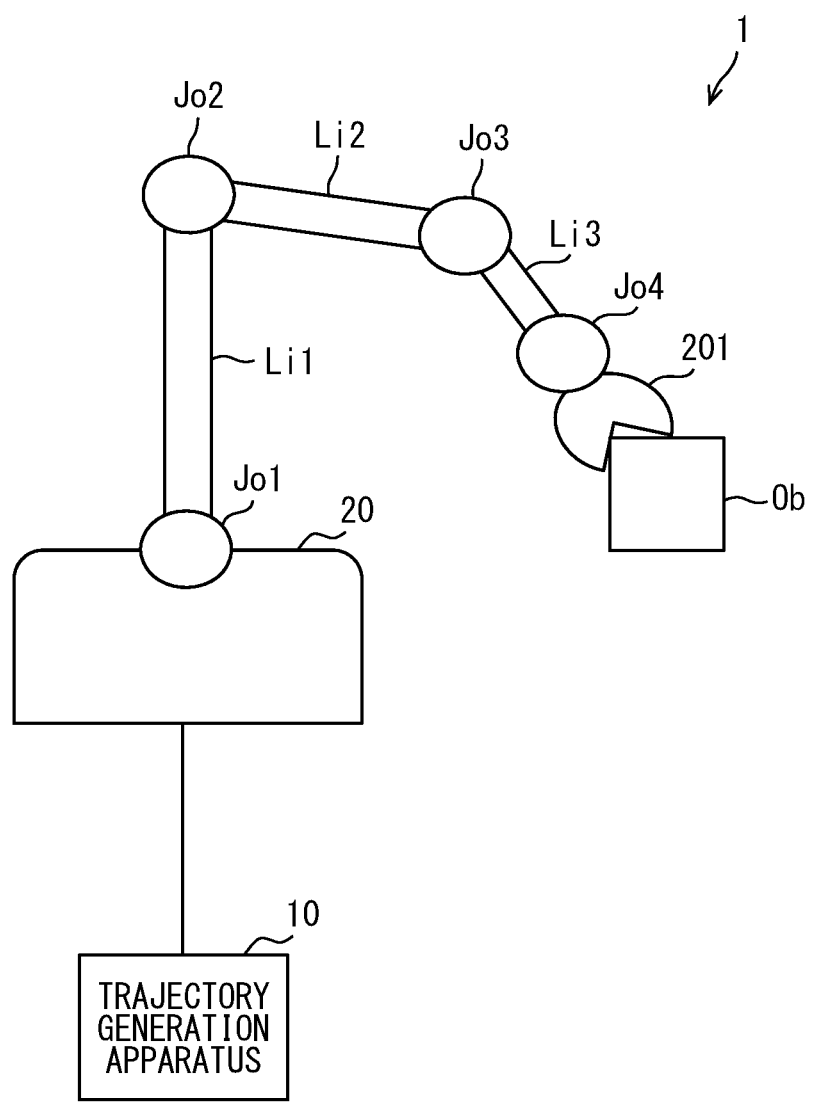
FIG. 1 is a diagram showing an example of a schematic configuration of a robot arm system according to a first embodiment.

Several embodiments for disclosure will be described with reference to the drawings. For convenience of description, the same reference signs are assigned to portions having the same functions as those illustrated in the drawings used in the description so far among the plurality of embodiments, and a description of the same portions may be omitted. The descriptions of other embodiments may be referred to with respect to these portions given the same reference signs.

First Embodiment

<Schematic Configuration of Robot Arm System 1>

The present embodiment will now be described with reference to the drawings. First, the robot arm system 1 according to a first embodiment will be described with reference to FIG. 1. As shown in FIG. 1, the robot arm system 1 includes a trajectory generation apparatus 10 and a robot arm 20. The robot arm system 1 corresponds to a multi-link system.

The robot arm 20 is a machine mechanism in which a plurality of links are connected by joints that are movable parts. The robot arm 20 is a subject of trajectory generation by the trajectory generation apparatus 10. A joint type of the robot arm 20 may employ a rotary joint, a linear joint, a ball joint or the like. In this embodiment, the joint of the robot arm 20 will be described as an example in which the joint is a rotary joint.

The robot arm 20 includes four joints (Jo1, Jo2, Jo3, Jo4 in FIG. 1). The joints of the robot arm 20 may be moved by actuators such as a motor provided for each joint. The robot arm 20 includes three links (Li1, Li2, Li3 in FIG. 1). A link can also be called a shaft. The link of the robot arm 20 may be a rigid body. The robot arm 20 includes one hand 201. The hand 201 can also be referred to as an end effector. As described above, the robot arm 20 is a multi-link mechanism including a plurality of joints and links. The robot arm 20 shown in FIG. 1 is merely an example. As long as the robot arm 20 has a multi-link mechanism, the number of joints and links may be different from the example shown in FIG. 1. For example, the robot arm 20 may be a six-axis vertical articulated robot arm.

The pedestal portion of the robot arm 20 and the link Li1 are connected by a joint Jo1. The link Li1 and the link Li2 are connected by a joint Jo2. The link Li2 and the link Li3 are connected by a joint Jo3. The link Li3 and the hand 201 are connected by the joint Jo4. The robot arm 20 changes the position and orientation of the hand 201 by moving each joint, thereby changing the joint angle.

The joint angle for the joint Jo1 is an angle of the link Li1 with respect to the pedestal portion. The joint angle for the joint Jo2 is an angle of the link Lin2 with respect to the link Lin1. The joint angle for the joint Jo3 is an angle of the link Lin3 with respect to the link Lin2. The joint angle of the joint Jo4 is an angle of the hand 201 with respect to the link Lin3. The angle of the hand 201 with respect to the link Lin3 corresponds to an orientation of the hand 201. Hereinafter, the joint angles of the joints Jo1 to Jo4 will be collectively referred to as a joint state. The trajectory of the robot arm may be a series of joint states. Note that the trajectory of the robot arm may be other than the series of joint states as long as it is a physical quantity that represents the trajectory of the motion of the robot arm that can be specified based on the joint state. For example, it may be a series of output values of actuators provided in each joint.

The trajectory generation apparatus 10 includes a CPU, a memory, an I/O, and a bus connecting these, and executes various processes by the CPU executing a control program stored in the memory. The memory mentioned in the above is a non-transitory tangible storage medium that stores non-transitorily computer-readable programs and data. The non-transitory tangible storage medium is realized by a semiconductor memory, a magnetic disc, or the like.

The trajectory generation apparatus 10 executes a process related to generation of a trajectory of the robot arm 20 (hereinafter, trajectory generation-related process). The trajectory generation apparatus 10 generates a trajectory from a joint state of the robot arm 20 to a target joint state for gripping an obstacle (Ob in FIG. 1) existing in the motion space of the robot arm 20. Then, the trajectory generation apparatus 10 moves or operates the robot arm 20 along the generated trajectory. The details of the trajectory generation apparatus 10 will be described below. The motion space refers to a space in which the robot arm 20 works.

<Schematic configuration of trajectory generation apparatus 10>

Figure 2:
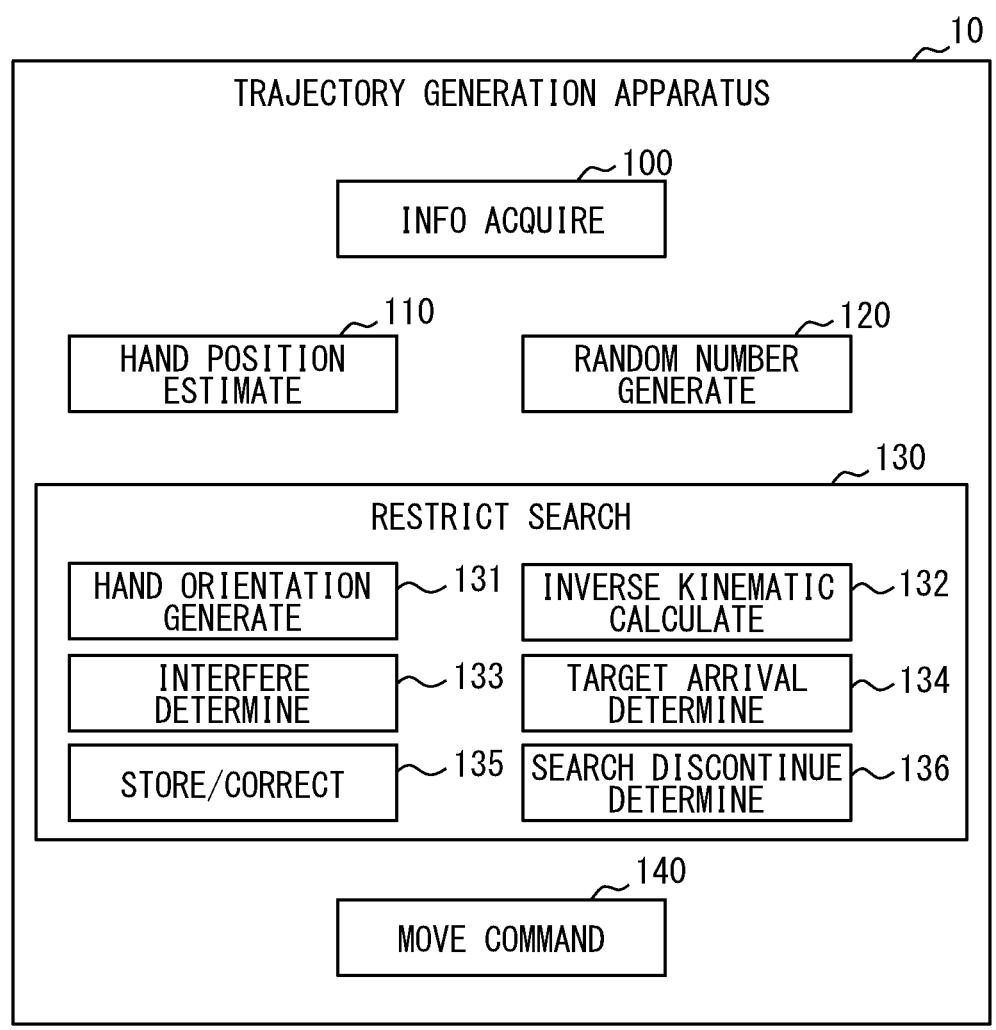
FIG. 2 is a diagram showing an example of a schematic configuration of a trajectory generation apparatus.

Subsequently, a schematic configuration of the trajectory generation apparatus 10 will be described with reference to FIG. 2. As shown in FIG. 2, the trajectory generation apparatus 10 includes an information acquisition unit 100, a hand position estimation unit 110, a random number generation unit 120, a restriction search unit 130, and a movement command unit 140, as functional blocks. It is noted that the information acquisition unit 100, the hand position estimation unit 110, the random number generation unit 120, the restriction search unit 130, and the movement command unit 140 may also be provided to be included in a controller. It is noted that an individual function of the units 110, 120, 130, 140 may be implemented (i) by configuring an CPU along with memory including computer-readable instructions of a program as described above, or (ii) by configuring as hardware circuitry alone by one or a plurality of ICs or the like without any CPU along with memory, or (iii) by configuring as a combination of (a) a CPU along with memory including computer-readable instructions in a program and (b) hardware circuitry by one or a plurality of ICs or the like. In the trajectory generation apparatus 10, the trajectory may be generated by using as a subject the 3D model of the obstacle and the robot arm 20 instead of the actual obstacle and the robot arm 20.

Figures 3, 4:
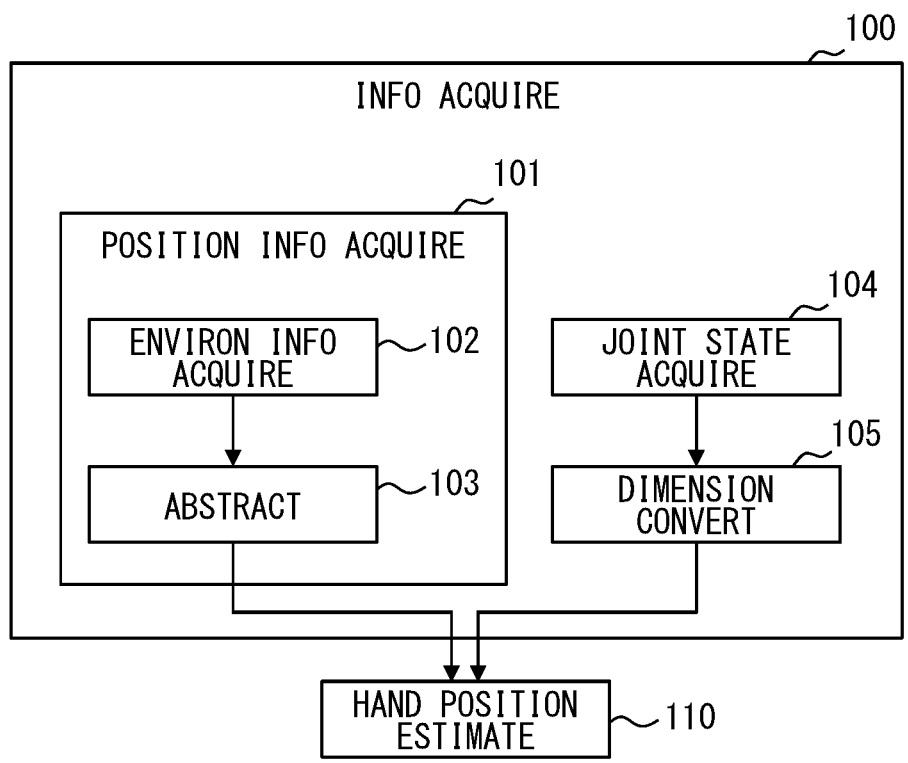
FIG. 3 is a diagram showing an example of a schematic configuration of an information acquisition unit.
FIG. 4 is a diagram showing an example of an equation for calculating a hand orientation $\alpha t+1$ at a second time.

The information acquisition unit 100 acquires information about the obstacle and the joint state of the robot arm 20. As shown in FIG. 3, the information acquisition unit 100 includes a position information acquisition unit 101, a joint state acquisition unit 104, and a dimension conversion unit 105.

The position information acquisition unit 101 acquires obstacle information regarding the position of an obstacle existing in the motion space of the robot arm 20. An obstacle existing in the motion space of the robot arm 20 will be simply referred to as an obstacle hereinafter. As shown in FIG. 3, the position information acquisition unit 101 includes an environment information acquisition unit 102 and an abstraction unit 103.

The environment information acquisition unit 102 acquires, as the obstacle information, position coordinates indicating the position of the obstacle in the three-dimensional space. That is, the environment information acquisition unit 102 acquires the position coordinates represented by the orthogonal coordinate system in the three-dimensional space as the information on the position of the obstacle. The origin of this orthogonal coordinate system may be a fixed point of the pedestal portion of the robot arm 20, for example. The environment information acquisition unit 102 may acquire the position coordinates of the obstacle by detecting the obstacle of the real object with a sensor such as a camera, or acquire the position coordinates of the obstacle on the simulation using the obstacle of the 3D model. The environment information acquisition unit 102 may be configured to acquire the position coordinates of the obstacle in the form of three-dimensional point cloud data (i.e., point group data).

The abstraction unit 103 converts the position coordinates of the obstacle in the form of the 3D point cloud data acquired by the environment information acquisition unit 102 into 3D grid data having a smaller amount of information. Specifically, the amount of information is reduced by collecting the position coordinates of the obstacle in the form of three-dimensional point cloud data into one point per division of unit interval having a position larger than the minimum position of the position coordinates.

The joint state acquisition unit 104 acquires the joint state of the robot arm 20. The joint state acquisition unit 104 may acquire the joint angles of the joints Jo1 to Jo4. The joint state acquisition unit 104 acquires the joint state of the robot arm 20 (hereinafter, subject joint state) at each time. For example, when the time is present, the subject joint state may be specified from the current driving state of the actuator that moves the joint. The joint state acquisition unit 104 may acquire the joint state of the actual robot arm 20, or may acquire the joint state on a simulation using the 3D model robot arm 20. If the time is in the future later than the present time, the joint state searched by the later-described restriction search unit 130 for the future time may be acquired as the subject joint state. The joint state acquisition unit 104 also acquires the final target joint state of the robot arm 20. The target joint state may be given by being input by an operator or the like.

The dimension conversion unit 105 converts the joint state of the robot arm 20 acquired by the joint state acquisition unit 104 into three-dimensional grid data of the same format as the three-dimensional grid data converted by the abstraction unit 103. The dimension conversion unit 105 may convert the joint state of the robot arm 20 acquired by the joint state acquisition unit 104 into this three-dimensional grid data using the learning result of machine learning such as DNN (Deep Neural Networks). As a result, the position coordinates of the obstacle and the joint state of the robot arm 20 are unified in the same three-dimensional grid data format. The dimension conversion unit 105 may use the learning result of machine learning in which the joint state of the robot arm 20 is input and the three-dimensional grid data is output. In machine learning, learning is performed on a plurality of different samples. The same applies to the subsequent machine learning. The learning result is a machine learning model in which learning has been performed. For example, the learning result may be a discriminator for which learning has been performed. The same applies to the subsequent.

The information acquisition unit 100 outputs, to the hand position estimation unit 110 described later, (i) the three-dimensional grid data of the position coordinates of the obstacle converted by the abstraction unit 103 and (ii) the three-dimensional grid data of the joint state of the robot arm 20 converted by the dimension conversion unit 105. That is, the position coordinates of the obstacle and the joint state of the robot arm 20 are unified into the three-dimensional grid data format and output to the hand position estimation unit 110.

Returning to FIG. 2, the hand position estimation unit 110 estimates the position (hereinafter, the hand position) of the hand 201 of the robot arm 20. The hand position corresponds to an end position. The hand position estimation unit 110 corresponds to an end position estimation unit. The hand position estimation unit 110 estimates a hand position at the next time (hereinafter, the second time), by using the learning result of machine learning such as DNN, based on the position coordinates of the obstacle input from the information acquisition unit 100, the subject joint state at a certain time (hereinafter, the first time), and the target joint state. The times corresponding to the first time and the second time change as the time as a subject advances. When the first time is t, the hand position at time t+1 is estimated as the hand position at the second time. When the first time is t+1, the hand position at time t+2 is estimated as the hand position at the second time. The hand position at the second time corresponds to a next end position.

The hand position estimation unit 110 may use a learning result of machine learning, in which the position coordinates of an obstacle, the joint state of the start (i.e., start joint state) of the robot arm 20, and the joint state of the goal (i.e., goal joint state) of the robot arm 20 are input, and the hand position of the robot arm 20 is output. An example of this machine learning may prepare dozens of environments with different starts and goals for each of thousands of different layouts. The layout may be such that several cubes having the same size are randomly arranged in the motion space so as not to overlap with the robot arm 20. For the start and the goal, joint states capable of taking non-interference poses with an obstacle may be randomly generated.

The position coordinates of the obstacle used for this machine learning, the start joint state of the robot arm 20, and the goa joint state of the robot arm 20 are unified in the same three-dimensional grid data format. In the multi-link mechanism, the obstacle and the multi-link mechanism may have different coordinate systems. This case may lead to a problem that it is necessary to learn a difficult coordinate conversion rule, from the three-dimensional orthogonal coordinate system (which is the coordinate system of the obstacle) to the joint coordinate system (which is the coordinate system of the robot arm 20). This problem makes it difficult to converge learning. On the other hand, according to the above configuration, it is possible to improve the learning convergence by unifying the coordinate systems as compared with the case where the coordinate systems are different. Further, by adopting the grid data format, it is possible to suppress the number of data to be handled and improve learning convergence.

Further, the learning result of the machine learning used by the hand position estimation unit 110 may be preferable to be the learning result of supervised learning (i.e., learning with teacher). This supervised learning is the machine learning performed using, as teacher data, the search result of the search that could reach the goal joint state without interfering with the obstacle. Interference refers to contact between an obstacle and the robot arm 20. The search may be performed using a path planning method such as (Rapidly Exploring Random Tree). For example, the teacher data may use the obstacle position and the joint state at each time step of the trajectory of the robot arm 20 that has reached the goal joint state without interfering with the obstacle.

The above configuration allows the machine learning to implicitly learn the joint state of the robot arm 20 that satisfies (i) reaching and (ii) contact avoidance. Therefore, as compared with the case where the joint state of the robot arm 20 is output, it is possible to more easily satisfy the completeness of the solution while performing the hierarchization with the hand position set to the intermediate state.

The random number generation unit 120 adds a random number as noise to at least one of the position coordinates of the obstacle, the subject joint state, and the target joint state, which are used by the hand position estimation unit 110 to estimate the hand position. That is, noise is added to the input of the hand position estimation unit 110. The random number may be normally distributed random number, for example. According to the above configuration, the effect of randomness due to the addition of noise to the input of the hand position estimation unit 110 enables earlier escape from the local solution in the hand position estimation using the learning result. As a result, the processing time required for the hand position estimation unit 110 to estimate the hand position can be further shortened.

Note that the random number generation unit 120 is not limited to having a configuration that adds noise to the input of the hand position estimation unit 110, and may have a configuration that adds noise to the output of the hand position estimation unit 110. In this case, the random number generation unit 120 may be configured to add a random number as noise to the hand position estimated by the hand position estimation unit 110. According to this, the effect of randomness by adding noise to the output of the hand position estimation unit 110 enables earlier escape from the local solution in the hand position estimation using the learning result. As a result, the processing time required for the hand position estimation unit 110 to estimate the hand position can be further shortened.

The restriction search unit 130 searches for the non-interfering joint state at the second time using the hand position estimated by the hand position estimation unit 110 as a restriction. The non-interfering joint state is a joint state of the robot arm 20 in which the robot arm 20 and the obstacle do not interfere with each other. Note that the hand position estimated by the hand position estimation unit 110 is the hand position to which the noise is added when the random number generation unit 120 employs a configuration that adds noise to the output of the hand position estimation unit 110. The same applies to the subsequent. As shown in FIG. 2, the restriction search unit 130 includes a hand orientation generation unit 131, an inverse kinematics calculation unit 132, an interference determination unit 133, a target arrival determination unit 134, a storage/correction unit 135, and a search discontinuation determination unit 136.

The hand orientation generation unit 131 generates the orientation of the hand 201 (hereinafter, the hand orientation) at the second time for taking the end position estimated by the hand position estimation unit 110. The hand orientation corresponds to an end orientation. The hand orientation generation unit 131 corresponds to an end orientation generation unit. The hand orientation generation unit 131 may preferably generate, as the hand orientation for taking the hand position at the second time estimated by the hand position estimation unit 110, a orientation in which the change in orientation is within a predetermined range from the hand orientation at the first time, which is the previous time of the second time. As an example, when the hand orientation at the first time is at, the hand orientation αt+1 at the second time is calculated by the equation shown in FIG. 4, and the hand orientation at the second time is generated. Here, θ in FIG. 4 is assumed to be a random number that satisfies −β<θ<β. β is a value that can be set optionally. This can put a restriction on the continuity of the motion of the robot arm 20; thus, it is possible to limit the range for searching for the non-interfering joint state to a realistic search range.

Note that the hand orientation generation unit 131 is not limited to have a configuration that generates the orientation in which the change in orientation from the hand orientation at the first time is within a predetermined range as the hand orientation at the second time. For example, any one of the hand orientations that can be selected as the hand orientation may be randomly selected to generate the hand orientation at the second time.

From the hand position estimated by the hand position estimation unit 110 and the hand orientation generated by the hand orientation generation unit 131, the inverse kinematics calculation unit 132 obtains the joint state of the robot arm 20 satisfying the hand position and the hand orientation by inverse kinematics calculation. That is, the joint of the robot arm at the second time that satisfies the hand position at the second time estimated by the hand position estimation unit 110 and the hand orientation at the second time generated by the hand orientation generation unit 131 is obtained with the inverse kinematics calculation. As an example, a method using a Jacobian matrix may be used as the inverse kinematics calculation. The inverse kinematics calculation unit 132 corresponds to a joint state obtainment unit.

The interference determination unit 133 determines whether there is interference between the robot arm 20 having the joint state obtained by the inverse kinematics calculation unit 132 and the obstacle. The interference determination unit 133 may determine whether the robot arm 20 interferes with the obstacle, for example, by determining whether the robot arm 20 and the obstacle contact each other on a simulation.

When it is determined by the interference determination unit 133 that there is interference, and the number of times of re-generation of the hand orientations at the same time (hereinafter, the number of searches) is equal to or less than a specified number U, the hand orientation generation unit 131 regenerates the hand orientation. In this case, the inverse kinematics calculation unit 132 obtains the joint state of the robot arm 20 satisfying the hand position and the hand orientation with inverse kinematics calculation from the hand position estimated by the hand position estimation unit 110 and the hand orientation regenerated by the hand orientation generation unit 131. Then, the interference determination unit 133 re-determines the presence or absence of interference between the obstacle and the robot arm 20 having the joint state obtained by the inverse kinematics calculation unit 132. That is, the search for the non-interfering joint state is continued. In this case, the hand orientation generation unit 131 may change the above-mentioned value of θ within a range that satisfies −β<θ<β, and recalculates the hand orientation αt+1 at the second time to regenerate the hand orientation at the second time. The restriction search unit 130 may count the number of searches. The number of searches corresponds to a counted number of end position generations. The specified number U here is a value that can be set optionally.

When the interference determination unit 133 determines that there is no interference, the target arrival determination unit 134 determines whether the non-interfering joint state searched by the restriction search unit 130 has reached the target joint state. The target arrival determination unit 134 may determine that the non-interfering joint state has reached the target joint state when the joint state determined by the interference determination unit 133 as not having the interference matches the target joint state. On the other hand, when the joint state determined to not have the interference by the interference determination unit 133 and the target joint state do not match, it may be determined that the non-interfering joint state has not reached the target joint state.

When the interference determination unit 133 determines that there is no interference, the storage/correction unit 135 stores the joint state determined to not have the interference by the interference determination unit 133 in the memory of the trajectory generation apparatus 10 as trajectory information. Further, the storage/correction unit 135 may store the trajectory information from the initial joint state of the robot arm 20 corresponding to the start to the target joint state corresponding to the goal. In this case, it is preferable to add a trajectory correction such as a shortcut that replaces the joint state at each time from the start to the goal as needed. The term "shortcut" here means to shorten the route from the start to the goal. This makes it possible to further improve the optimality of the solution.

The search discontinuation determination unit 136 discontinues the search for the non-interfering joint state when the interference determination unit 133 determines that there is interference, and the number of searches exceeds the specified number U. In this case, the hand position estimation unit 110 re-estimates the hand position at the second time to a different hand position, and then searches for the non-interfering joint state again. When the hand position estimation unit 110 re-estimates the hand position at the second time, the hand position may be re-estimated until the different hand position is estimated from the learning result of machine learning with the same input. Further, the random number generation unit 120 may change the noise added to the input or the output, and the hand position estimation unit 110 may re-estimate the hand position at the second time to a different hand position. According to this, even if the search for the non-interfering joint state is not completed no matter how many times the hand orientation is regenerated, the search can be aborted when the number of searches exceeds the specified number U. This can prevent the situation where the search for the non-interfering joint state is not completed no matter how many times the hand orientation is regenerated.

As described above, when the interference determination unit 133 determines that there is no interference, the restriction search unit 130 ends the search for the non-interfering joint state. Further, when the interference determination unit 133 determines that there is interference, the number of searches, which is the number of times of re-generation of the hand orientation in the hand orientation generation unit 131, may be less than the specified number U. In such a case, in the restriction search unit 130, the hand orientation generation unit 131 regenerates the hand orientation to a different hand orientation and the search for the non-interfering joint state is continued. On the other hand, in the restriction search unit 130, when the number of searches exceeds the specified number U, the search for the non-interfering joint state is discontinued, the hand position estimation unit 110 re-estimates to a different hand position, and then the search for non-interfering joint state is redone. Searching and storing the non-interfering joint state at each time by the restriction search unit 130 corresponds to generating a trajectory of the robot arm 20.

The movement command unit 140 transmits a motion control signal to the actuators provided in the joints Jo1 to Jo4 of the robot arm 20 in order to realize the motion along the trajectory of the robot arm 20 generated by the restriction search unit 130. As a result, the robot arm 20 is controlled to move along the trajectory generated by the trajectory generation apparatus 10.

<Trajectory Generation-Related Process in Trajectory Generation Apparatus 10>

Figure 5:
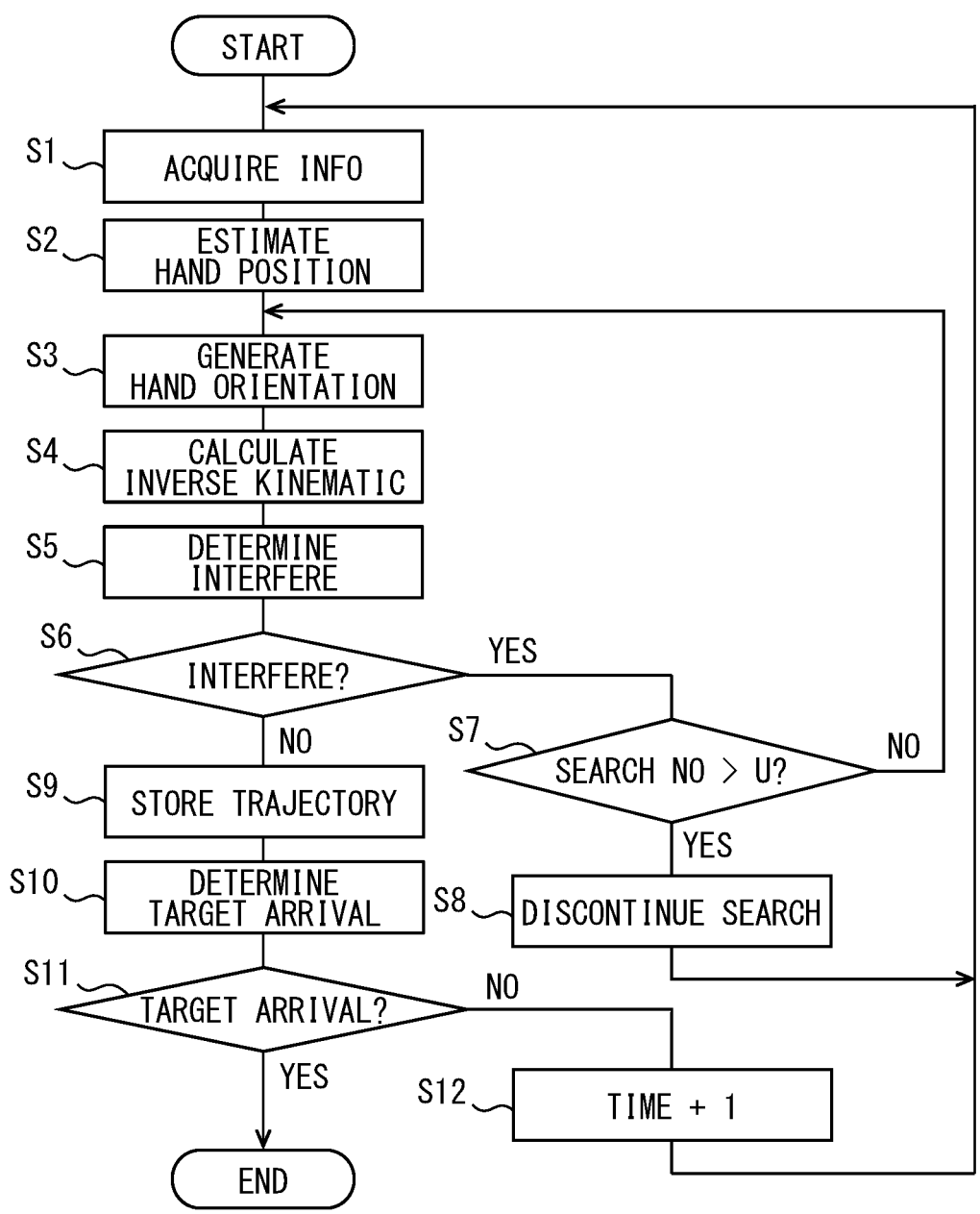
FIG. 5 is a flowchart showing an example of a sequence of a trajectory generation-related process in the trajectory generation apparatus.

Next, an example of the sequence of the trajectory generation-related process in the trajectory generation apparatus 10 will be described using the flowchart of FIG. 5. Executing the steps included in the trajectory generation-related process by a processor corresponds to executing a trajectory generation method. The flowchart of FIG. 5 may be configured to start when an operation input for starting trajectory generation is made by an operator or the like, for example.

First, in step S1, the information acquisition unit 100 acquires the position coordinates of an obstacle, the subject joint state at the first time, and the target joint state. Step S1 corresponds to a position information acquisition step. In step S2, the hand position estimation unit 110 estimates the hand position at the second time, which is the next time, based on (i) the position coordinates of the obstacle acquired in S1, (ii) the subject joint state at the first time, and (iii) the target joint state, by using the learning result of machine learning. Step S2 corresponds to an end position estimation step.

In S1 and S2, the time as a subject is added each time the sequence is repeated to return to S1. For example, when the first time is t1 and the second time is t+1, the first time is advanced to t+1 and the second time is advanced to t+2. Note that in S1, each time the sequence may be repeated to return to S1, a configuration may be adopted in which information that changes with time, such as the subject joint state at the first time, is acquired again. Further, in S1, the random number generation unit 120 adds noise to the input or output of the hand position estimation unit 110.

In step S3, the hand orientation generation unit 131 generates the hand orientation at the second time. In step S4, the inverse kinematics calculation unit 132 obtains the joint state of the robot arm 20 satisfying the hand position and the hand orientation, by inverse kinematics calculation, from the hand position estimated in S2 and the hand orientation generated in S3.

In step S5, the interference determination unit 133 determines whether there is interference between the robot arm 20 having the joint state obtained in S4 and the obstacle. In step S6, when the interference determination unit 133 determines that there is no interference (NO in S6), the process proceeds to step S9. On the other hand, when the interference determination unit 133 determines that there is interference (YES in S6), the process proceeds to step S7.

In step S7, when the number of searches, which is the number of times of regenerating the hand orientation for the same time, exceeds the specified number U (YES in S7), the process proceeds to step S8. On the other hand, when the number of searches is equal to or less than the specified number U (NO in S7), the process returns to S3. The hand orientation is thereby regenerated to a different hand orientation, and the search for the non-interfering joint state is continued. In step S8, the search discontinuation determination unit 136 discontinues the search for the non-interfering joint state. Then, returning to S1, the hand position is re-estimated to a different hand position, and the search for the non-interfering joint state is performed again.

In step S9, the storage/correction unit 135 stores the joint state determined to have no interference in S5, in the memory of the trajectory generation apparatus 10 as trajectory information. The joint state determined to have no interference in S5 corresponds to a non-interfering joint state that can be searched by the restriction search unit 130. In step S10, the target arrival determination unit 134 determines whether the non-interfering joint state searched by the restriction search unit 130 has reached the target joint state.

In step S11, when the target arrival determination unit 134 determines that the non-interfering joint state has reached the target joint state (YES in S11), the trajectory generation-related process ends. When it is determined that the non-interfering joint state has reached the target joint state, the storage/correction unit 135 may add a trajectory correction such as a shortcut to be replaced as needed. Such a shortcut is for replacing the stored joint state at each time from the initial joint state of the robot arm 20 to the target joint state. On the other hand, when the target arrival determination unit 134 determines that the non-interfering joint state has not reached the target joint state (NO in S11), the process proceeds to step S12. In step S12, the time is advanced to the next time, the process returns to S1 to repeat the process. For example, when the time is t, the time is advanced to t+1, the process returns to S1 to repeat the process. At least a part of the steps in S3 to S12 corresponds to a restriction search step.

Summary of First Embodiment

Figure 6:
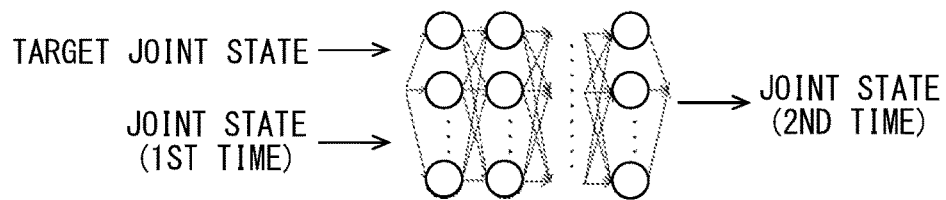
FIG. 6 is a diagram for explaining an example of obtaining a joint state only by a machine learning model as a comparative example.
Figure 7:
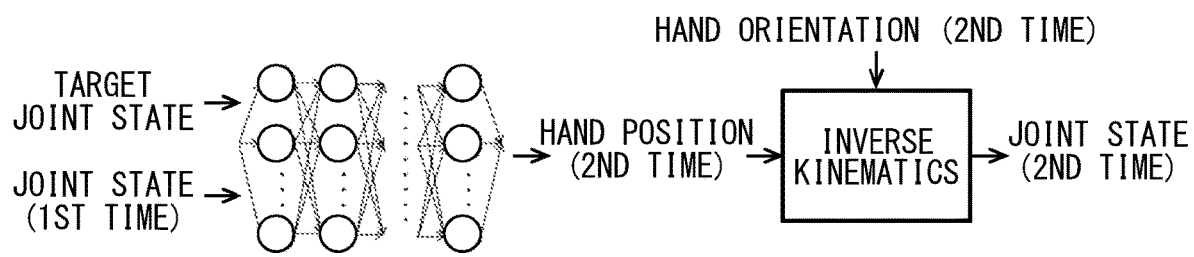
FIG. 7 is a diagram for explaining an example of obtaining a joint state by combining a machine learning model and a search.

The effects of the configuration of the first embodiment will be described with reference to FIGS. 6 and 7. FIG. 6 is a diagram for explaining an example in which the joint state is obtained by the machine learning model alone. FIG. 7 is a diagram for explaining an example of obtaining a joint state by combining a machine learning model and a search.

The example of FIG. 6 is an example in which the joint state of the robot arm 20 is obtained only by a machine learning model that inputs the target joint state and the joint state at the first time and outputs the joint state at the second time. If the machine learning model can converge learning, it becomes possible to generate a more appropriate trajectory in a short time. However, in the machine learning model shown in FIG. 6, both the input and the output are the joint state of the robot arm 20 which is a multi-link mechanism. Therefore, the motion patterns to be learned become enormous, and it is difficult to converge the learning.

On the other hand, in the configuration of the first embodiment, as shown in FIG. 7, in the upper hierarchy, the hand position instead of the joint state of the robot arm 20 is obtained by the machine learning model; in the lower hierarchy, the remaining joint state is searched with the hand position as a restriction. According to the configuration of the first embodiment, the upper hierarchy uses a machine learning model in which the target joint state and the joint state at the first time are input and the hand position at the second time is output. That is, in comparison with the case where the joint state of the robot arm 20 is output, hierarchization is performed with the hand position as the intermediate state. In the configuration of the first embodiment, by outputting the hand position having a smaller number of states than the joint state, the learning can be more easily converged than when the joint state is output. In the configuration of the first embodiment, since such a machine learning model is used, it can be realized more easily than using a machine learning model that outputs a joint state as shown in FIG. 6.

According to the configuration of the first embodiment, the hand position up to the second time is estimated at least by machine learning. Therefore, it becomes possible to generate a trajectory in which the optimality is more easily satisfied in a shorter time than in the case where the trajectory of the robot arm 20 is generated only by searching without using machine learning.

Further, since the hand position is influenced by all joints of the robot arm 20, it can be said that important information for generating the trajectory of the robot arm 20 is contracted. Therefore, even if layering or hierarchization is performed with the hand position as an intermediate state, information for satisfying the completeness and optimality of the solution is hardly to be excluded, and the completeness and optimality of the solution can be easily satisfied.

The learning of the lower hierarchy, which needs to consider the entire joint state of the robot arm 20, is more difficult than the upper hierarchy, which only needs to store the relative relationship with the hand position where the information is contracted. On the other hand, in the configuration of the first embodiment, the joint state in the lower hierarchy having a high learning difficulty is obtained by the search with the hand position obtained in the upper hierarchy as a restriction. In this search, the trajectory of the robot arm 20 is generated by searching for a non-interfering joint state of the robot arm 20 in which the robot arm 20 and the obstacle do not interfere with each other at the second time. Therefore, the search can satisfy the completeness of the solution. As a result, the trajectory of the robot arm 20 can be generated more easily and in a shorter time, and the completeness and the optimality of the solution can be more compatible with each other.

Second Embodiment

Although the first embodiment has shown the configuration in which only the final target joint state is used as the target joint state, there is no need to be limited thereto. For example, a configuration (hereinafter, second embodiment) may be provided in which the target joint state be a target joint state as a sub goal (hereinafter, sub target state) before the final target joint state is reached. For example, the sub-target state is to sequentially divide the joint states from the initial joint state to the final target joint state, and the sub-target state of the last division may be the final target joint state. Note that the final target joint state may be configured to be distinguished from the sub-target state. However, the present embodiment will describe an example in which the final target joint state and the sub-target state are not distinguished.

Hereinafter, an example of the second embodiment will be described with reference to the drawings. The robot arm system 1 of the second embodiment is the same as the robot arm system 1 of the first embodiment, except that the trajectory generation apparatus 10*a* is included instead of the trajectory generation apparatus 10. The robot arm system 1 of the second embodiment also corresponds to a multi-link system.

Figure 8:
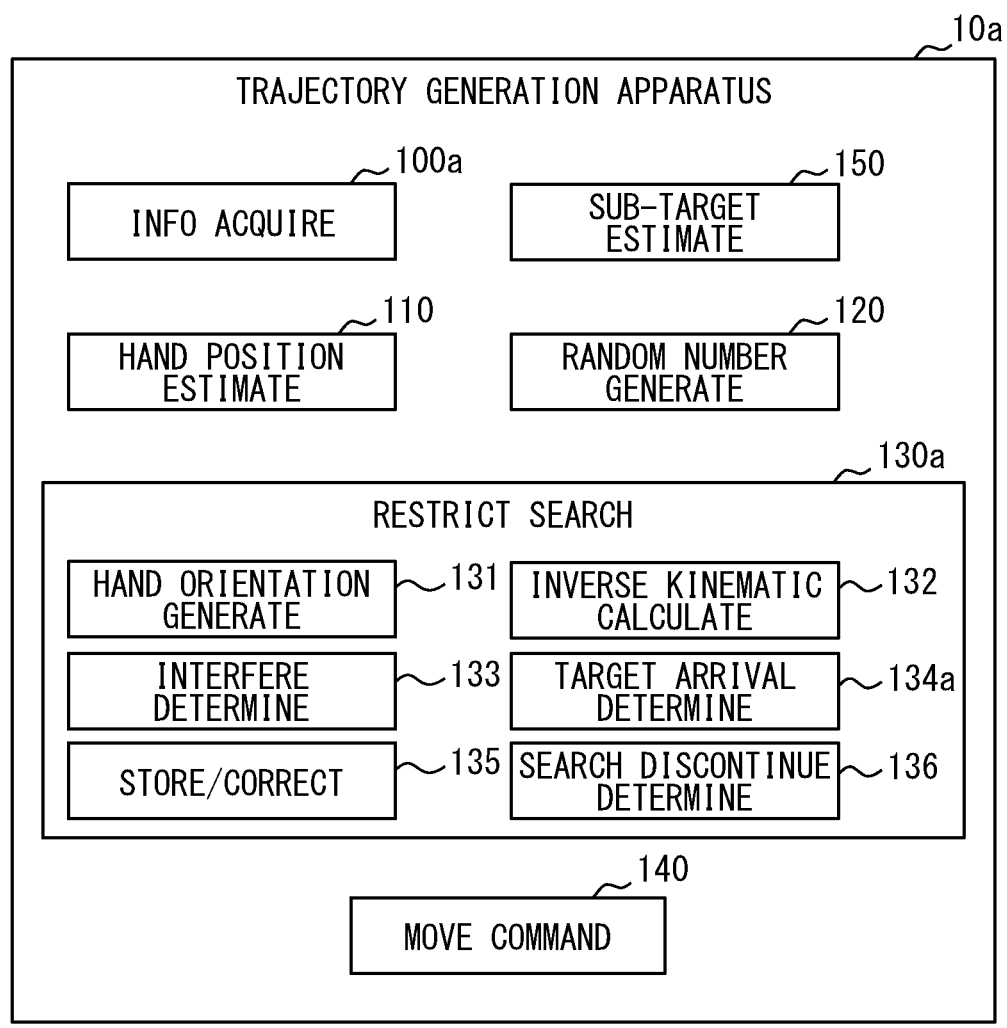
FIG. 8 is a diagram showing an example of a schematic configuration of a trajectory generation apparatus according to a second embodiment.

Here, an example of a schematic configuration of the trajectory generation apparatus 10*a* will be described with reference to FIG. 8. As shown in FIG. 8, the trajectory generation apparatus 10*a* includes an information acquisition unit 100*a*, a hand position estimation unit 110, a random number generation unit 120, a restriction search unit 130*a*, a movement command unit 140, and a sub-target estimation unit 150, as functional blocks. The trajectory generation apparatus 10*a* is the same as the trajectory generation apparatus 10 of the first embodiment except that the information acquisition unit 100*a* and the restriction search unit 130*a* are substituted for the information acquisition unit 100 and the restriction search unit 130, and the sub-target estimation unit 150 is included.

The sub-target estimation unit 150 obtains the probability distribution of the joint state of the robot arm 20 at an optional time, based on the position coordinates of the obstacle acquired by the information acquisition unit 100*a*, the initial joint state of the robot arm 20, and the final target joint state of the robot arm 20, by using the learning result of the machine learning in which the start joint state of the robot arm 20, the goal joint state of the robot arm, and the position coordinates of the obstacle are input, and the probability distribution of the joint state of the robot arm 20 at an optional time is output. As an example, CVAE (Conditional Variational AutoEncoder) may be used as the machine learning here. Further, in order to output the probability distribution, random numbers (0 to 1) of normal distribution may be added to the input.

Further, the sub-target estimation unit 150 performs clustering on the obtained probability distribution of the joint state of the robot arm 20 at the optional time. As the clustering, for example, the K-means method may be used. Then, the sub-target estimation unit 150 estimates the sub-target state, which is the target joint state as the sub-goal before reaching the final target joint state of the robot arm 20, by this clustering.

The information acquisition unit 100*a* acquires the sub target state estimated by the sub-target estimation unit 150 as the target joint state. The hand position estimation unit 110 estimates the hand position at the second time using the sub-target state as the target joint state. Note that every time the target arrival determination unit 134*a* described later determines that the sub-target state is reached, the hand position estimation unit 110 may estimate the hand position at the second time by switching the sub-target state used for estimation to the next sub-target state. Here, the next sub-target state is the next sub-target state in the order of the sub-target states arranged in order from the initial joint state of the robot arm 20 to the final target joint state. The final target joint state is the sub-target state at the end of the order.

As illustrated in FIG. 8, the restriction search unit 130*a* includes a hand orientation generation unit 131, an inverse kinematics calculation unit 132, an interference determination unit 133, a target arrival determination unit 134*a*, a storage/correction unit 135, and a search discontinuation determination unit 136. The restriction search unit 130*a* is similar to the restriction search unit 130 of the first embodiment, except that the target arrival determination unit 134*a* is provided instead of the target arrival determination unit 134. When the interference determination unit 133 determines that there is no interference, the target arrival determination unit 134*a* determines whether the non-interfering joint state searched by the restriction search unit 130*a* has reached the sub-target state.

In the trajectory generation apparatus 10*a*, a series of processes of the hand position estimation by the hand position estimation unit 110 and the search for the non-interfering joint state by the restriction search unit 130*a* are performed by sequentially switching the sub-target states until the final target joint state is reached, while the sub-target state estimated by the sub-target estimation unit 150 is the target joint state as a subject.

Figure 9:
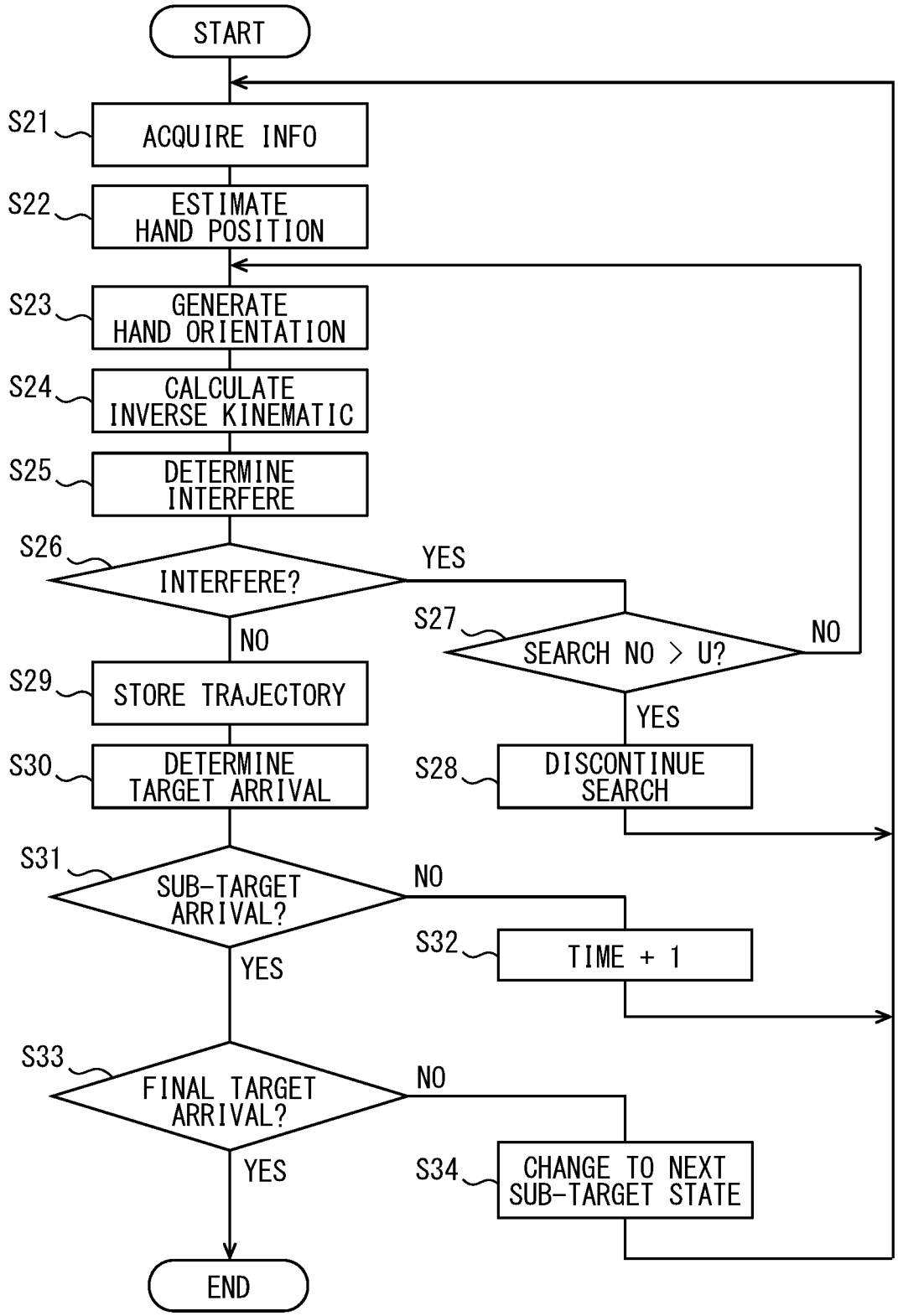
FIG. 9 is a flowchart showing an example of a sequence of a a trajectory generation-related process in the trajectory generation apparatus according to the second embodiment.

Here, an example of the sequence of the trajectory generation-related process in the trajectory generation apparatus 10a will be described using the flowchart of FIG. 9. Executing the steps included in this trajectory generation-related process by a processor also corresponds to executing a trajectory generation method. The flowchart of FIG. 9 may also be configured to start when an operation input for starting trajectory generation is made by an operator or the like.

First, in step S21, the information acquisition unit 100a acquires the position coordinates of the obstacle, the subject joint state at the first time, and the target joint state. S21 also corresponds to a position information acquisition step. In step S22, similarly to S2, the hand position estimation unit 110 estimates the hand position at the second time, which is the next time, based on the position coordinates of the obstacle acquired in S21, the target joint state St at the first time, and the target joint state, by using the learning results of machine learning. S22 also corresponds to an end position estimation step.

In S21 to S22, the time as a subject is added each time the sequence is repeated to return to S21. In S21, each time the sequence is repeated to return to S21, it may be configured such that information that changes with time, such as the subject joint state St at the first time, is acquired again. Further, in S21, a configuration may be provided such that the next sub-target state is reacquired as the target joint state each time the searched non-interfering joint state reaches a sub-target state other than the sub-target state that is the final target joint state and returns to S21. Also in S21, it is preferable that the random number generation unit 120 adds noise to the input or output of the hand position estimation unit 110.

In steps S23 to S29, the same steps as S3 to S9 are performed. In step S30, the target arrival determination unit 134a determines whether the non-interfering joint state searched by the restriction search unit 130a has reached the sub-target state. In step S31, when the target arrival determination unit 134a determines that the non-interfering joint state has reached the sub-target state (YES in S31), the process proceeds to step S33. On the other hand, when the target arrival determination unit 134a determines that the non-interfering joint state has not reached the sub-target state (NO in S31), the process proceeds to step S32. In step S32, the time is advanced to the next time, the process returns to step S21 to repeat the process.

In step S33, if the sub-target state determined to have reached the searched non-interfering joint state is the final target joint state (YES in S33), the trajectory generation-related process is ended. On the other hand, when the sub target state determined to have reached the searched non-interfering joint state is not the final target joint state (NO in S33), the process proceeds to step S34. In step S34, the sub-target state to be the target joint state is changed to the target state next to the sub-target state in which the search is completed, the process returns to S21 to repeat the process. At least a part of steps of S23 to S34 corresponds to a restriction search step.

The configuration of the second embodiment is the same as the configuration of the first embodiment, except that the target joint state is divided into a plurality of sub-goals for processing. Therefore, as in the first embodiment, the trajectory of the robot arm 20 can be generated more easily and in a shorter time, and the completeness and the optimality of the solution can be more compatible with each other.

Further, according to the configuration of the second embodiment, the inverse kinematics calculation that occupies several tens of percent of the processing time for generating the trajectory of the robot arm 20 is approximated by the learning result of machine learning. This can reduce the processing time. As a result, it becomes easier to generate the trajectory within a more realistic time.

According to the above configuration, the target joint state is divided into a plurality of sub-goals and processed. This makes it possible to further reduce the processing time required to generate the trajectory of the robot arm 20 while further improving the optimality of the solution. In particular, this effect is remarkable when the distance from the initial target state of the robot arm 20 to the final target state is long.

Third Embodiment

In the first embodiment, a configuration is described in which the joint state of the robot arm 20 satisfying the hand position and the hand orientation is obtained by inverse kinematics calculation, from the hand position estimated by the hand position estimation unit 110 and the hand orientation generated by the hand orientation generation unit 131. However, it is not necessarily limited thereto. For example, a configuration (hereinafter, a third embodiment) may be provided to use, instead of the inverse kinematics calculation, the learning result of the machine learning that approximates the inverse kinematics calculation.

Hereinafter, an example of a third embodiment will be described with reference to the drawings. The robot arm system 1 according to the third embodiment is the same as the robot arm system 1 according to the first embodiment except that the trajectory generation apparatus 10b is included instead of the trajectory generation apparatus 10. The robot arm system 1 of the third embodiment also corresponds to a multi-link system.

Figure 10:
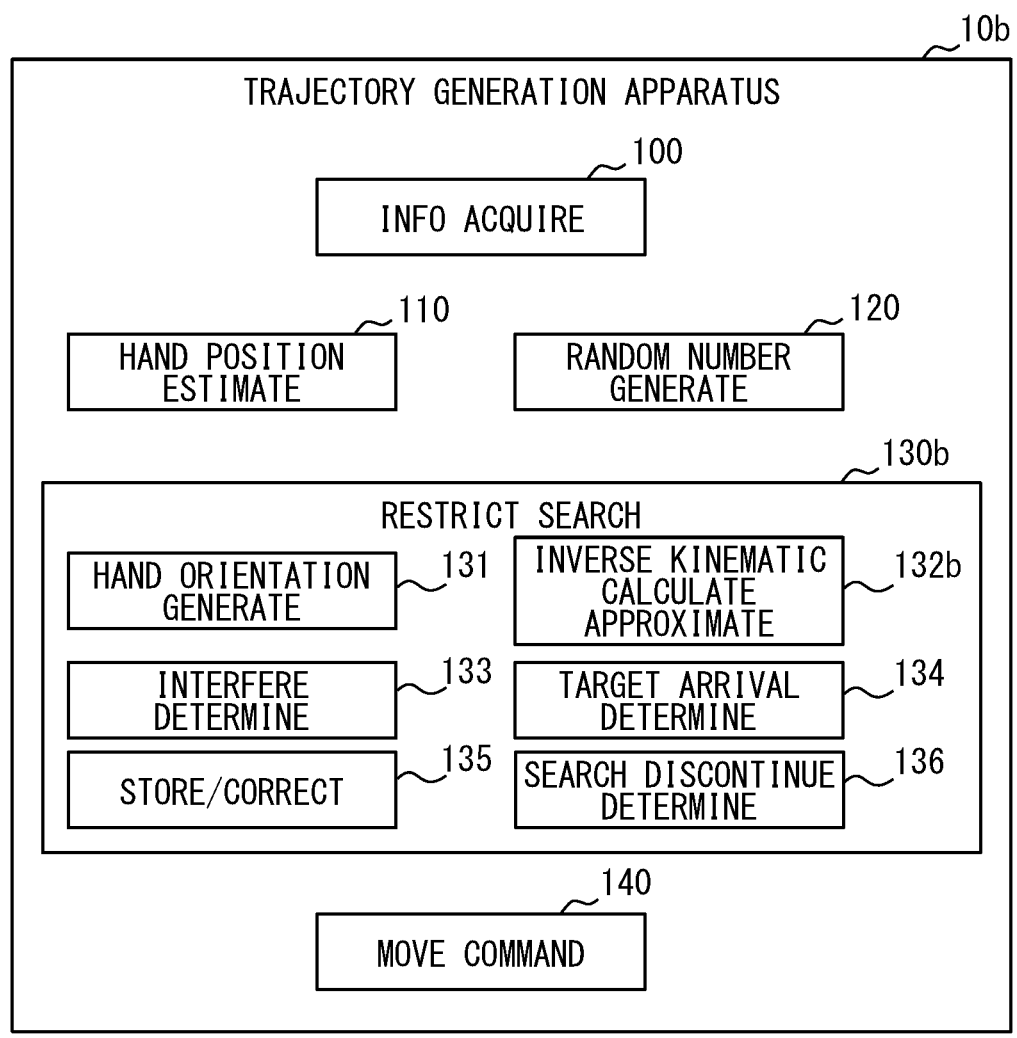
FIG. 10 is a diagram showing an example of a schematic configuration of a trajectory generation apparatus according to a third embodiment.

Here, an example of a schematic configuration of the trajectory generation apparatus 10b will be described with reference to FIG. 10. As shown in FIG. 10, the trajectory generation apparatus 10b includes an information acquisition unit 100, a hand position estimation unit 110, a random number generation unit 120, a restriction search unit 130b, and a movement command unit 140, as functional blocks. The trajectory generation apparatus 10b is the same as the trajectory generation apparatus 10 of the first embodiment, except that the restriction search unit 130a is substituted for the restriction search unit 130.

As shown in FIG. 10, the restriction search unit 130b includes a hand orientation generation unit 131, an inverse kinematics calculation approximation unit 132b, an interference determination unit 133, a target arrival determination unit 134, a storage/correction unit 135, and a search discontinuation determination unit 136. The restriction search unit 130b is the same as the restriction search unit 130 of the first embodiment, except that the inverse kinematics calculation approximation unit 132b is substituted for the inverse kinematics calculation unit 132.

The inverse kinematics calculation approximation unit 132b obtains the joint state of the robot arm 20 satisfying the hand position and the hand orientation, from the hand position at the second time estimated by the hand position estimation unit 110 and the hand orientation at the second time generated by the hand orientation generation unit 131, by using the learning result of machine learning in which the combination of the hand position and the hand orientation taken by the hand 201 is an input, and the joint state of the robot arm 20 is an output. The machine learning here may be configured using DNN or the like. The inverse kinematics calculation approximation unit 132*b* also corresponds to a joint state obtainment unit. The interference determination unit 133 determines whether there is interference between the obstacle and the robot arm 20 having the joint state determined by the inverse kinematics calculation approximation unit 132*b*.

The configuration of the third embodiment is the same as the configuration of the first embodiment except that the learning result of machine learning that approximates the inverse kinematics calculation is used instead of the inverse kinematics calculation. Therefore, as in the first embodiment, the trajectory of the robot arm 20 can be generated more easily and in a shorter time, and the completeness and the optimality of the solution can be more compatible with each other.

Further, according to the configuration of the third embodiment, the inverse kinematics calculation that occupies several tens of percent of the processing time for generating the trajectory of the robot arm 20 is approximated by the learning result of machine learning. This can reduce this processing time. As a result, it becomes easier to generate the trajectory of the robot arm 20 within a more realistic time.

Fourth Embodiment

The above-described embodiment has described the configuration in which the random number generation unit 120 adds noise to the input or output of the hand position estimation unit 110. There is no need to be limited thereto. For example, the trajectory generation apparatus 10, 10*a*, and 10*b* may not include the random number generation unit 120, and noise may not be added to the input or output of the hand position estimation unit 110.

Fifth Embodiment

The above-described embodiment has described a configuration in which the search discontinuation determination unit 136 discontinues the search for the non-interfering joint state when the number of searches, which is the number of times of regenerating the hand orientation at the same time, exceeds the specified number U. However, it is not necessarily limited to this. For example, the trajectory generation apparatus 10, 10*a*, and 10*b* may not include the search discontinuation determination unit 136, and may be configured not to discontinue the search for the non-interfering joint state based on the number of searches. In this case, the restriction search units 130, 130*a*, 130*b* may be configured not to count the number of searches.

Sixth Embodiment

The above-described embodiment has described a configuration in which the position coordinates of the obstacle in the coordinate system of the obstacle and the joint state of the coordinate system of the robot arm 20 are unified in the same three-dimensional grid data format. However, it is not necessarily limited to this. For example, the position coordinates of the obstacle and the joint state of the robot arm 20 may not be unified in the same three-dimensional grid data format. In this case, the information acquisition unit 100 may not include the abstraction unit 103 and the dimension conversion unit 105. Even if the position coordinates of the obstacle and the joint state of the robot arm 20 are not unified into the same three-dimensional grid data format, the coordinate conversion rule from the obstacle coordinate system to the robot arm 20 coordinate system is learned. Thus, the hand position estimation unit 110 can estimate the hand end position.

Seventh Embodiment

The above-described embodiment has described a configuration in which the trajectory generation apparatus 10, 10*a*, 10*b* are provided with the movement command unit 140. However, it is not necessarily limited to this. For example, the trajectory generation apparatus 10, 10*a*, and 10*b* may not include the movement command unit 140. In this case, a device different from the trajectory generation apparatus 10, 10*a*, and 10*b* may have the function of the movement command unit 140.

Eighth Embodiment

The above-described embodiment has described a configuration in which the trajectory generation apparatus 10, 10*a*, 10*b* generate the trajectory of the robot arm 20. However, it is not necessarily limited to this. For example, the trajectory generation apparatuses 10, 10*a*, 10*b* may be configured to generate the trajectory of the multi-link mechanism other than the robot arm 20.

Note that the present disclosure is not limited to the embodiments described above and can variously be modified within the scope of the disclosure. An embodiment obtained by appropriately combining the technical means disclosed in the different embodiments is also included in the technical scope of the present disclosure. The controllers, units included in the controllers, and methods described in the present disclosure in the above embodiments may be implemented by one or more special-purpose computers. Such computers may be created (i) by configuring a memory and a processor programmed to execute one or more particular functions embodied in computer programs, or (ii) by configuring a processor provided by one or more special-purpose hardware logic circuits without CPU, or (iii) by configuring a combination of (a) a memory and a processor programmed to execute one or more particular functions embodied in computer programs and (b) a processor provided by one or more hardware logic circuits. The computer programs may be stored, as instructions to be executed by a computer, in a tangible non-transitory computer-readable storage medium.

For reference to further explain features of the present disclosure, the description is added as follows.

A technique is known for generating a trajectory of a multi-link mechanism such as a robot arm. A technique is known for learning a behavioral sequence of a hand (i.e., end effector) of a robot, to reach a target position while avoiding an obstacle, by learning a deep neural network (hereinafter, referred to as DNN). Hereinafter, the method of generating the trajectory of the multi-link mechanism using the learning result of the machine learning will be referred to as a learning-based method. In addition, as a technique for generating a trajectory of a multi-link mechanism, a technique is also known such as RRT (Rapidly exploring random tree) that randomly searches for and generates a trajectory while considering the motion restriction of the multi-link mechanism. A method of randomly searching for a trajectory and generating it while considering the motion restriction of the multi-link mechanism will be referred to as a search-based method below.

In the search-based method, it is possible to generate a more appropriate trajectory by spending time on the search, but it is difficult to generate an appropriate trajectory in a short time. On the other hand, the learning-based method can generate a more appropriate trajectory in a short time, but it is difficult to learn a learning result that can generate an appropriate trajectory. The reason is as follows. That is, the behavior output of the multi-link mechanism is a continuous value, and the multi-link mechanism has multiple axes. It is therefore necessary to handle a multidimensional state space. Such backgrounds increase enormously the number of motion patterns to be learned.

Here, it is possible to reduce the number of states handled in learning by layering a complicated problem into a plurality of sub-problems. However, in the layering or hierarchization, if the granularity of problem division is large in the upper hierarchy, necessary information is removed, and there may arise a problem that the completeness and optimality of the solution are impaired. For example, as a problem of solution completeness, there may be a problem that the goal generated in the upper hierarchy is unreachable in the lower hierarchy due to the structure of the joints having the multilink function. In addition, as a problem of optimality of the solution, it is considered that the goal generated in the upper hierarchy requires a lot of detours with respect to the shortest route in the lower hierarchy due to the structure of the joints having the multi-link function. It is thus desired to provide a trajectory generation apparatus, a multi-link system, and a trajectory generation method, which make it possible to generate a trajectory of a multi-link mechanism more easily and in a shorter time, while achieving both the completeness and optimality of the solution.

Aspects of the present disclosure described herein are set forth in the following clauses.

According to a first aspect of the present disclosure, a trajectory generation apparatus is provided to generate a trajectory of a multi-link mechanism in a motion space. The multi-link mechanism is a machine mechanism in which a plurality of links are connected by joints that are movable parts.

The trajectory generation apparatus includes an information acquisition unit, an end position estimation unit, and a restriction search unit. The information acquisition unit is configured to acquire obstacle information regarding a position of an obstacle existing in the motion space of the multi-link mechanism. The end position estimation unit is configured to estimate a next end position that is an end position being a position of an end effector of the multi-link mechanism at a second time that is a time next to a first time, based on (i) a subject joint state of the multi-link mechanism at the first time, (ii) a target joint state of the multi-link mechanism, and (iii) the obstacle information acquired by the information acquisition unit, by using a learning result of a machine learning in which a start joint state of the multi-link mechanism, a goal joint state of the multi-link mechanism, and the obstacle information are input and the end position being the position of the end effector of the multi-link mechanism is output. The restriction search unit is configured to search for a non-interfering joint state of the multi-link mechanism, in which the obstacle and the multi-link mechanism at the second time do not interfere with each other, while considering as a restriction the next end position estimated by the end position estimation unit.

According to a second aspect of the present disclosure, a trajectory generation method is provided A computer-implemented trajectory generation method executed by at least one processor to generate a trajectory of a multi-link mechanism in a motion space. The multi-link mechanism is a machine mechanism in which a plurality of links are connected by joints that are movable parts. The trajectory generation method includes: a position information acquisition step, an end position estimation step, and a restriction search step. The position information acquisition step acquires obstacle information relating to a position of an obstacle existing in the motion space of the multi-link mechanism. The end position estimation step estimates a next end position that is an end position being a position of an end effector of the multi-link mechanism at a second time that is a time next to a first time, based on (i) a subject joint state of the multi-link mechanism at the first time, (ii) a target joint state of the multi-link mechanism, and (iii) the obstacle information, by using a learning result of a machine learning in which a start joint state of the multi-link mechanism, a goal joint state of the multi-link mechanism, and the obstacle information are input and the end position being the position of the end effector of the multi-link mechanism is output. The restriction search step searches for a non-interfering joint state of the multi-link mechanism, in which the obstacle and the multi-link mechanism at the second time do not interfere with each other, while considering as a restriction the next end position.

According to the above configuration, a machine learning inputs the start joint state of the multi-link mechanism, the goal joint state of the multi-link mechanism, and obstacle information and outputs the end position that is the position of the end effector of the multi-link mechanism. Such a machine learning outputs the end position having the number of states smaller than that of the joint state of the multi-link mechanism. Therefore, the hierarchization with the end position set to the intermediate state is applied to the case where the joint state of the multi-link mechanism is output. Therefore, the learning can be converged more easily than in the case where the joint state of the multi-link mechanism is output without hierarchization. Since the result of such machine learning is used, it can be realized more easily than using of the result of machine learning outputting the joint state of the multi-link mechanism. Further, the learning result of machine learning allows the estimation up to the next end position; this next end position is used as a restriction for searching for the joint state at the next time. Therefore, it becomes possible to generate the next end position and the joint state as the trajectory of the multi-link mechanism. Yet further, the learning result of machine learning allows the estimation up to the next end position. Therefore, it becomes possible to generate a trajectory in which the optimality is more easily satisfied in a shorter time than in the case where the trajectory is generated only by the search without using the machine learning.

Further, since the end position is influenced by all joints of the multi-link mechanism, it can be said that important information for generating the trajectory of the multi-link mechanism is contracted. Therefore, even if hierarchization or layering is performed with the end position set to the intermediate state, information for satisfying the completeness and optimality of the solution is hardly excluded, and the completeness and optimality of the solution are easily satisfied. Furthermore, with the next end position as a restriction, a non-interfering joint state of the multi-link mechanism at which the multi-link mechanism and the obstacle do not interfere at the second time is searched for. By doing so, the trajectory of the multi-link mechanism is generated, so that it is possible to satisfy the completeness of the solution by the search. As a result, the trajectory of the multi-link mechanism can be generated more easily and in a shorter time, and the completeness and the optimality of the solution can be more compatible with each other.

According to a third aspect of the present disclosure, a multi-link system is provided to include a trajectory generation apparatus of the first aspect, and a multi-link mechanism. The multi-link mechanism is a machine mechanism in which a plurality of links are connected by joints that are movable parts, the multi-link mechanism being controlled to move along a trajectory generated by the trajectory generation apparatus.

According to this, since the above-described trajectory generation apparatus is included, the trajectory of the multi-link mechanism can be generated more easily and in a shorter time. Both the completeness and the optimality of the solution can thus be obtained.

What is claimed is:

1. A trajectory generation apparatus configured to generate a trajectory of a multi-link mechanism in a motion space, the multi-link mechanism being a machine mechanism in which a plurality of links are connected by joints that are movable parts,
the trajectory generation apparatus comprising:
an information acquisition unit configured to acquire obstacle information regarding a position of an obstacle existing in the motion space of the multi-link mechanism;
an end position estimation unit configured to estimate a next end position that is an end position at a second time that is a time next to a first time, the end position being a position of an end effector of the multi-link mechanism,
based on (i) a subject joint state of the multi-link mechanism at the first time, (ii) a target joint state of the multi-link mechanism, and (iii) the obstacle information acquired by the information acquisition unit,
by using a learning result of a machine learning in which
a start joint state of the multi-link mechanism, a goal joint state of the multi-link mechanism, and the obstacle information are input and
the end position being the position of the end effector of the multi-link mechanism is output; and
a restriction search unit configured to search for a non-interfering joint state of the multi-link mechanism, in which the obstacle and the multi-link mechanism at the second time do not interfere with each other, while considering as a restriction the next end position estimated by the end position estimation unit, wherein:
the restriction search unit is configured to include:
an end orientation generation unit configured to generate an end orientation that is an orientation of the end effector to take the next end position estimated by the end position estimation unit;
a joint state obtainment unit configured to obtain a joint state of the multi-link mechanism satisfying the next end position estimated by the end position estimation unit and the end orientation generated by the end orientation generation unit; and
an interference determination unit configured to determine whether an interference is present between the obstacle and the multi-link mechanism that takes the joint state obtained by the joint state obtainment unit, wherein:
in response to the interference determination unit determining that the interference is not present, the restriction search unit is configured to end searching for the non-interfering joint state; and
in response to the interference determination unit determining that the interference is present, the restriction search unit is configured to determine whether a counted number of times of end orientation generation, which is a counted number of times the end orientation is regenerated by the end orientation generation unit, is less than or equal to a specified number,
wherein:
in cases that it is determined that the counted number of times of end orientation generation is less than or equal to the specified number in response to the interference determination unit determining that the interference is present,
the end orientation is regenerated into a different end orientation by the restriction search unit with the end orientation generation unit, and searching for the non-interfering joint state is continued by the restriction search unit, and
in cases that it is determined that the counted number of times of end orientation generation is greater than the specified number in response to the interference determination unit determining that the interference is present,
searching for the non-interfering joint state while considering as the restriction the next end position is discontinued by the restriction search unit,
the next end position is re-estimated into a different next end position by the end position estimation unit, and
then searching for the non-interfering joint state while considering as the restriction the different next end position is re-started by the restriction search unit.

2. The trajectory generation apparatus according to claim 1, further comprising:
a target arrival determination unit configured to determine whether the non-interfering joint state searched by the restriction search unit has reached the target joint state, wherein:
until the non-interfering joint state searched by the restriction search unit is determined to have reached the target joint state by the target arrival determination unit, a series of processes of estimating the next end position by the end position estimation unit and searching for the non-interfering joint state by the restriction search unit are repeated while sequentially advancing the time.

3. The trajectory generation apparatus according to claim 1, wherein:
the end orientation generation unit is configured to generate the end orientation at the second time for taking the next end position estimated by the end position estimation unit, such that a change of the end position at the second time from the orientation of the end effector at the first time is within a predetermined range.

4. The trajectory generation apparatus according to claim 1, further comprising:
a random number generation unit configured to add, as a noise, a random number to either (i) at least one of three based on which the next end position is estimated by the end position estimation unit, a first of the three being the obstacle information, a second of the three being the subject joint state, and a third of the three being the target joint state, or (ii) the next end position estimated by the end position estimation unit.

5. The trajectory generation apparatus according to claim 1, wherein:
the joint state obtainment unit is configured to obtain the joint state of the multi-link mechanism that satisfies the next end position estimated by the end position estimation unit and the end orientation generated by the end orientation generation unit, by using an inverse kinematics calculation.

6. The trajectory generation apparatus according to claim 1, wherein:
the joint state obtainment unit is configured to obtain the joint state of the multi-link mechanism satisfying the next end position estimated by the end position estimation unit and the end orientation generated by the end orientation generation unit,
by using the learning result of machine learning in which a combination of a position and an orientation that are enabled to be taken by the end effector is enabled to take is input and
the joint state of the multi-link mechanism is output.

7. The trajectory generation apparatus according to claim 1, further comprising:
a sub-target estimation unit configured to estimate a sub-target state that is a target joint state as a sub-goal until reaching a final target joint state of the multi-link mechanism, by
(i) using a learning result of machine learning in which the start joint state of the multi-link mechanism, the goal joint state of the multi-link mechanism, and the obstacle information of the obstacle are input, and a probability distribution of the joint state of the multi-link mechanism at an optional time, and
(ii) clustering with respect to the probability distribution of the joint state of the multi-link mechanism at the optional time, the probability distribution being obtained based on an initial joint state of the multi-link mechanism, the final target joint state of the multi-link mechanism, and the obstacle information acquired by the information acquisition unit,
wherein:
a series of processing of estimating the next end position by the end position estimation unit and searching for the non-interfering joint state by the restriction search unit are performed by sequentially switching the sub-target state until the final target joint state is reached, while regarding the sub-target state estimated by the sub-target estimation unit as the target joint state.

8. The trajectory generation apparatus according to claim 1, wherein:
the information acquisition unit is configured to include
a position information acquisition unit configured to acquire a three-dimensional grid data of the obstacle information by converting coordinates of the position of the obstacle into a format of three-dimensional grid data; and
a dimension conversion unit configured to provide a three-dimensional grid data of a joint state of the multi-link mechanism by converting the joint state into the format of the three-dimensional grid data,
wherein:
the end position estimation unit is configured to estimate the next end position,
based on the three-dimensional grid data of the obstacle information, the three-dimensional grid data of the subject joint state at the first time, and the three-dimensional grid data of the target joint state,
by using a learning result of machine learning in which the three-dimensional grid data of the obstacle information, the three-dimensional grid data of the goal joint state of the multi-link mechanism, and the three-dimensional grid data of the start joint state of the multi-link mechanism, which are unified in the format of the three-dimensional grid data, are input and
the end position, which is the position of the end effector of the multi-link mechanism, is output.

9. A multi-link system comprising:
a trajectory generation apparatus according to claim 1; and
a multi-link mechanism, which is a machine mechanism in which a plurality of links are connected by joints that are movable parts, the multi-link mechanism being controlled to move along a trajectory generated by the trajectory generation apparatus.

10. A computer-implemented trajectory generation method executed by at least one processor to generate a trajectory of a multi-link mechanism in a motion space, the multi-link mechanism being a machine mechanism in which a plurality of links are connected by joints that are movable parts,
the trajectory generation method comprising:
acquiring obstacle information relating to a position of an obstacle existing in the motion space of the multi-link mechanism;
estimating a next end position that is an end position at a second time that is a time next to a first time, the end position being a position of an end effector of the multi-link mechanism, based on, (i) a subject joint state of the multi-link mechanism at the first time, (ii) a target joint state of the multi-link mechanism, and (iii) the obstacle information, by using a learning result of a machine learning in which a start joint state of the multi-link mechanism, a goal joint state of the multi-link mechanism, and the obstacle information are input and the end position being the position of the end effector of the multi-link mechanism is output; and
searching for a non-interfering joint state of the multi-link mechanism, in which the obstacle and the multi-link mechanism at the second time do not interfere with each other, while considering as a restriction the next end position, wherein
searching for the non-interfering joint state of the multi-link mechanism includes:
generating an end orientation that is an orientation of the end effector to take the next end position that is estimated;
obtaining a joint state of the multi-link mechanism satisfying the next end position that is estimated and the end orientation that is generated; and
determining whether an interference is present between the obstacle and the multi-link mechanism that takes the joint state that is obtained,
wherein:
in response to determining that the interference is not present, end searching for the non-interfering joint state; and
in response to determining that the interference is present, determining whether a counted number of times of end orientation generation, which is a counted number of times the end orientation is regenerated, is less than or equal to a specified number, wherein:
in cases that it is determined that the counted number of times of end orientation generation is less than or equal to the specified number in response to determining that the interference is present,
the end orientation is regenerated into a different end orientation, and searching for the non-interfering joint state is continued, and
in cases that it is determined that the counted number of times of end orientation generation is greater than the specified number in response to determining that the interference is present,
searching for the non-interfering joint state while considering as the restriction the next end position that is discontinued,
the next end position is re-estimated into a different next end position, and
then searching for the non-interfering joint state while considering as the restriction the different next end position is re-started.

11. A trajectory generation apparatus configured to generate a trajectory of a multi-link mechanism in a motion space, the multi-link mechanism being a machine mechanism in which a plurality of links are connected by joints that are movable parts,
the trajectory generation apparatus comprising one or more processors configured to:
acquire obstacle information regarding a position of an obstacle existing in the motion space of the multi-link mechanism;
estimate a next end position that is an end position at a second time that is a time next to a first time, the end position being a position of an end effector of the multi-link mechanism,
based on (i) a subject joint state of the multi-link mechanism at the first time, (ii) a target joint state of the multi-link mechanism, and (iii) the obstacle information,
by using a learning result of a machine learning in which
a start joint state of the multi-link mechanism, a goal joint state of the multi-link mechanism, and the obstacle information are input and
the end position being the position of the end effector of the multi-link mechanism is output; and
search for a non-interfering joint state of the multi-link mechanism, in which the obstacle and the multi-link mechanism at the second time do not interfere with each other, while considering as a restriction the next end position, wherein
the one or more processors are further configured to:
generate an end orientation that is an orientation of the end effector to take the next end position that is estimated;
obtain a joint state of the multi-link mechanism satisfying the next end position that is estimated and the end orientation that is generated; and
determine whether an interference is present between the obstacle and the multi-link mechanism that takes the joint state that is obtained,
wherein:
in response to determining that the interference is not present, end searching for the non-interfering joint state; and
in response to determining that the interference is present, determine whether a counted number of times of end orientation generation, which is a counted number of times the end orientation is regenerated, is less than or equal to a specified number,
wherein:
in cases that it is determined that the counted number of times of end orientation generation is less than or equal to the specified number in response to determining that the interference is present,
the end orientation is regenerated into a different end orientation, and searching for the non-interfering joint state is continued, and
in cases that it is determined that the counted number of times of end orientation generation is greater than the specified number in response to determining that the interference is present,
search for the non-interfering joint state while considering as the restriction the next end position that is discontinued,
the next end position is re-estimated into a different next end position, and
then search for the non-interfering joint state while considering as the restriction the different next end position is re-started.

* * * * *